UNITED STATES PATENT OFFICE.

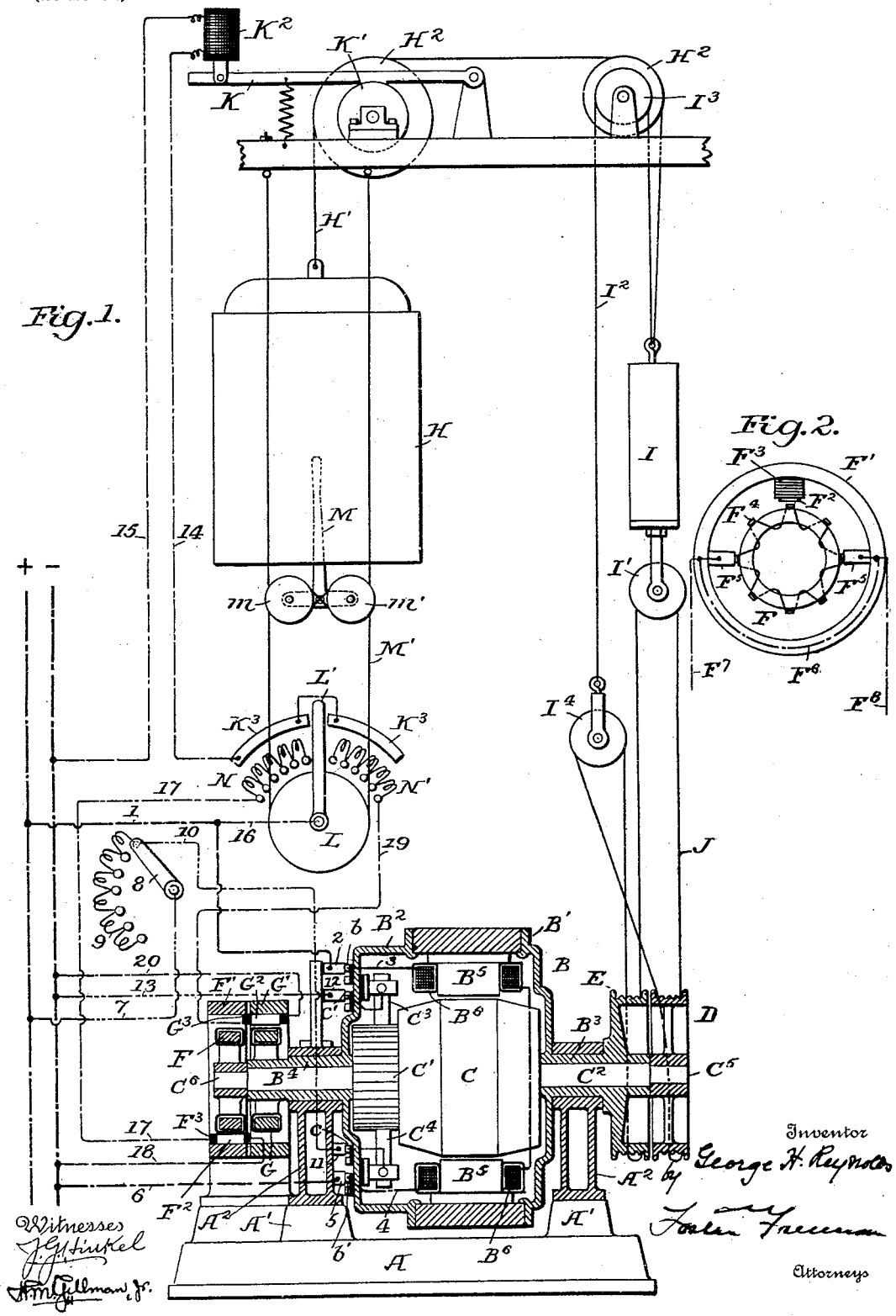

GEORGE H. REYNOLDS, OF NEW YORK, N. Y., ASSIGNOR TO THE OTIS ELEVATOR COMPANY, OF EAST ORANGE, NEW JERSEY, A CORPORATION OF NEW JERSEY.

ELECTRIC MOTOR.

SPECIFICATION forming part of Letters Patent No. 710,716, dated October 7, 1902.

Application filed December 5, 1900. Serial No. 38,782. (No model.)

*To all whom it may concern:*

Be it known that I, GEORGE H. REYNOLDS, a citizen of the United States, residing at New York, in the county and State of New York, have invented certain new and useful Improvements in Electric Motors, of which the following is a specification.

My invention relates to electric motors, and more especially to that class of electric motors which are adapted to drive two rotating parts in opposite directions and to provide for varying the speed of the machine or device operated thereby; and its object is to provide an improved motor of this general class; and it consists in the various features of construction and arrangement of parts having the general mode of operation substantially as hereinafter more particularly set forth.

Referring to the accompanying drawings, Figure 1 is a diagrammatic representation of one embodiment of my invention, the motor proper being shown generally in section; and Fig. 2 is an enlarged detail showing one form of brake device.

While my improved motor is adapted for many and various uses, it is, among others, especially adapted for use in connection with electric elevators, and I shall describe my invention in this connection, and it is understood, of course, that the invention is not limited by such description.

In the present instance I have shown the motor as connected with an elevator apparatus of what is generally known as the "Fraser" type, in which there is an endless driving-rope connected to start, stop, drive, and vary the speed of the elevator, according to the manner in which the motor is driven.

Referring to the drawings, in the embodiment therein illustrated there is a base A, upon which are mounted suitable standards A' A', and mounted in said standards is a rotating field-magnet B, and mounted to operate in connection therewith is a rotating armature C. The rotating field-magnet B may be of any usual and desired construction, and in the present instance it is shown in the form of a frame or spider B' B², connected to sleeves B³ B⁴, mounted in bearings A² on the standards A' and supporting the field-magnet poles B⁵ B⁵, which are energized in the usual way by means of suitable field-magnet coils B⁶ B⁶.

The armature C may be of any suitable and usual construction and is preferably provided with the usual commutator C' and is mounted on a shaft C², having bearings in the sleeves B³ B⁴ of the rotating field-magnet. The brushes C³ C⁴ bear on the commutator and are mounted on the frame or spider B² of the field-magnet, being suitably insulated therefrom. Connected to the armature-shaft and the field-magnet shaft or sleeves are two pulleys D and E, the former, D, being shown as mounted on the reduced end C⁵ of the shaft C² and the latter, E, being mounted on the sleeve B³ of the field-magnet, or preferably being formed integral therewith and with one of the frames or spiders B'. In the present instance these pulleys are shown with grooved edges adapted to receive an endless traveling rope; but of course they may be of any suitable construction, according to the devices which are to coöperate with them. Also mounted on or connected with the shafts of the armature and motor are suitable brake devices F and G. These brake devices may be of any suitable construction; but in the present instance I have shown an electromagnetic brake, which may be a generating-brake and which may be utilized to send current into the line or for any purpose desired in any well-known way. These brakes in the present instance consist of stationary field-magnets and rotating armatures, the field-magnets being mounted upon the base A and the armatures being mounted upon the armature-shaft and field-magnet shaft of the motor. Thus F represents an armature of the brake mounted on the extension C⁶ of the armature-shaft C², and F' is a field-magnet having a pole or poles F², surrounded by a coil or coils F³, and G is an armature mounted on the sleeve B⁴ of the rotating field-magnet of the motor, and G' is a stationary field-magnet therefor having a pole or poles G², surrounded by a coil or coils G³. It will thus be seen that while the details of construction may vary the motor includes, among other things, a rotating field-magnet and armature mounted so as to coact and coöperate with each other in a manner to rotate in opposite directions, and connected to each of these is some sort of a driving-pulley to transmit the motion or power of the parts of the motor to any mechanism to be operated thereby, and connected with the armature and field-magnet of the motor is a brake device of some proper construction by means of which the speed of rotation of the armature or rotating field-magnet, or both, can be varied or controlled.

In the present instance, as before stated, I have shown an electromagnetic brake, (shown typically in Fig. 2,) in which the field-magnet $F'$ is in the form of a ring having a single pole $F^2$ and coil $F^3$, while the armature F is in the form of a ring having a Gramme coil or winding thereon, the outer portions of the coils forming what may be termed the "commutator-plates" $F^4$, and there are mounted on the field-magnet $F'$ suitable brushes $F^5$, coöperating with the commutator-plates $F^4$, and these brushes are connected directly by a conductor $F^6$ or connected to wires $F^7$ $F^8$, which can lead to the line or any translating device.

In the drawings the armature-coils are shown as placed at some distance apart for convenience of illustration, and it will be understood that in the form shown, with brushes $F^5$ connected by conductor $F^6$, the armature is short-circuited upon itself; but the brushes may be connected, as by the wires $F^7$ $F^8$, so that the current generated in the armature may be utilized for any desired purpose.

In the drawings I have shown diagrammatically an elevator comprising a car H, connected to a suspensory rope $H'$, passing over a sheave or sheaves $H^2$ $H^2$ and connected to a counterweight I. This counterweight carries a pulley $I'$ at its lower end and is connected by a suitable cable $I^2$, which passes over a sheave $I^3$ to another pulley $I^4$. There is an endless rope or cable J, which passes around the pulleys $I'$ and $I^4$ and the driving-pulleys D and E of the motor in such direction that when said driving-pulleys D and E are rotating at a uniform speed the pulleys $I'$ and $I^4$ remain in their relative positions; but when the speed of one or the other driving-pulley D or E is varied either fast or slow, as the case may be, one or the other of the pulleys $I'$ $I^4$ will be drawn downward and the other allowed to move upward, thus either raising or lowering the counterweight I, which in turn controls the movement of the elevator car or cage H. It is also desirable to provide a suitable brake device to control the movement of the cage independent of the motor, and in the present instance I have shown a brake-lever K, normally bearing on a brake-wheel $K'$, and there is a magnet $K^2$, controlling the movement of this lever.

Any suitable devices for controlling th power supplied to the motor may be utilized, and in the present instance I have shown one manner of connecting the parts and controlling the same, which is sufficient to enable those skilled in the art to understand and utilize the invention. In this instance $+$ and $-$ represent the main or leading wires, and extending from the $+$ wire is a conductor 1, leading to a fixed brush 2, adapted to bear on a ring $b$, mounted on but insulated from the frame $B^2$ and connected by a conductor 3 with the field-magnet coils $B^6$ $B^6$, and thence by a conductor 4 to a contact-ring $b'$, mounted on the frame $B^2$, and thence by a brush 5 and conductor 6 to the $-$ line-wire. With this construction the field-magnet is constantly energized; but in actual practice a suitable cut-out switch and safety device would be put in the line, as is usual in this class of apparatus; but it is not deemed necessary to show them herein.

The current for the rotating armature in the present instance can be supplied through conductor 7, connected to the $+$ main and to a switch 8, which is adapted to coöperate with a suitable starting resistance 9, and this is connected by conductor 10 to a brush 11, bearing on a ring $c$, mounted on but insulated from the frame $B^2$, and connected by a suitable conductor with the brush $C^4$, bearing on the commutator $C'$. The brush $C^3$ also bears on the commutator and is connected to a ring $c'$, also mounted on but insulated from the frame $B^2$, and a brush 12 bears on this ring and is connected by a conductor 13 with the $-$ main.

Of course any suitable control devices of any well-known sort may be included in this armature and field circuit; but for the sake of clearness they are omitted, and the switch 8 is shown in a position to cut out the armature resistance 9, the parts being shown in such condition as to cause the armature and field to rotate in opposite directions and at uniform speeds, so that the driving-pulleys D E are supposed to be rotating in opposite directions and at uniform speeds. Under these conditions the elevator-cage or any other mechanism connected with the pulleys will remain stationary, and in order to start or stop the elevator and to regulate the speed thereof I utilize the brakes F and G to change the speed of one or the other of the rotating armature or field of the motor. In order to do this, in the present instance I have shown a control device L, which may be operated in any suitable way, as from the car, by means of a lever M, connected to the car and carrying pulleys $m$ $m'$, around which passes a rope or cable $M'$, which also passes around the control device L, and it is understood that according as the lever M is moved to the right or left the control device L is correspondingly moved in a manner well understood by those skilled in the art.

Connected to the control device L is a switch-arm $L'$, and arranged on either side of this arm are arcs or segments $K^3$ $K^3$, connected by a conductor 14 to the magnet K² and by conductor 15 to the − main, while the arm L' is connected by conductors 1 and 16 to the + main. It will thus be seen that in the position shown in the drawings the brake-magnet K² is not energized and the brake-lever K is applied to hold the car stationary; but as soon as the switch-arm L' is moved to the right or left the magnet K² is energized, raising the brake-lever K and releasing the cage, so that it can move up or down.

Arranged in proper relation with the control device L are certain resistance devices N N', and the resistance devices N are connected by conductor 17 to the field-magnet coils F³ of one of the brake devices and thence by conductor 18 to the − main, while the resistance devices N' are connected by conductor 19 to the field-magnet coils G³ of the other brake device and thence by conductor 20 with the − main. It will thus be seen that as the control device L is moved in one or the other direction current will flow through the conductors 1 and 16, through the switch-arm, and through the resistance device N or N' to the respective field-magnet coils connected therewith, and thus a braking effect will be produced upon the rotating armature or field-magnet of the motor, causing it to rotate more slowly or even to stop, and this effect will be varied by the resistance devices N and N', which can be cut in or out of circuit to a greater or less extent. This will of course cause one or the other of the driving-pulleys D or E to rotate slower than its normal speed, and the counterweight I will be raised or lowered, as the case may be, and together with it the car connected thereto.

Of course it will be understood that as the one or the other of the armature or field-magnet of the motor is caused to rotate slower the other will correspondingly increase in speed, as the relative speeds of the armature and field-magnet always remain the same as long as the current supplied to the motor remains the same. It will also be understood that the rate of travel of the elevator-car depends upon the relative speeds of the driving-pulleys D and E, and of course the direction of travel of the car depends upon whether the armature driving-pulley or the field driving-pulley travels faster or slower.

When it is desired to stop the car, of course the control device is operated to bring the switch-arm L' to its normal position, which breaks the circuit of the brake-magnet K², and the brake is instantly applied and the current cut off from the brake device F or G, and then the armature and field-magnet of the motor rotate at a uniform rate of speed, and the driving-pulleys associated with the armature and with the field will also rotate at a uniform speed, and the car stops.

Having thus set forth the general principles of my invention and illustrated one manner of applying the same, without limiting myself to the specific features of construction and arrangement of parts set forth, what I claim is—

1. The combination of a motor having armature and field capable of opposite rotation, a driving-pulley associated with the armature, a driving-pulley associated with the field, an electromagnetic generator associated with the armature, and an electromagnetic generator associated with the field to vary the speed rates of said rotating armature and field, substantially as described.

2. The combination of a motor having armature and field capable of opposite rotation, a driving-pulley associated with the armature, a driving-pulley associated with the field, a brake device associated with the armature, a brake device associated with the field, a circuit-control device controlling said brake devices, an elevator-car, and connections between the car and circuit-control device, substantially as described.

3. The combination of a motor having armature and field capable of opposite rotation, a driving-pulley associated with the armature, a driving-pulley associated with the field, a brake device associated with the armature, a brake device associated with the field, a circuit-control device for said brake devices, an elevator-car, a brake controlling the car, connections between the car and circuit-control device, and connections between the car-brake and circuit-control device whereby the car-brake and the motor-brake are operated, substantially as described.

4. The combination with a motor having armature and field capable of opposite rotation, a driving-pulley associated with the armature, a driving-pulley associated with the field, a brake-armature associated with the armature of the motor, a brake-armature associated with the field, field-magnets for said brake-armatures, and circuit and connections for controlling the supply of current, substantially as described.

5. The combination of two independent pulleys, a cable passing around the same and formed into loops, a sheave engaging each loop and connected with a part to be moved, a motor having an armature and a field mounted to turn in opposite directions and each connected to drive one of said pulleys, and means for varying the speed ratios of the two pulleys, substantially as set forth.

In testimony whereof I have signed my name to this specification in the presence of two subscribing witnesses.

GEORGE H. REYNOLDS.

Witnesses:
RUDOLPH C. SMITH,
E. W. MARSHALL.